United States Patent [19]

Mori et al.

[11] Patent Number: 5,101,545
[45] Date of Patent: Apr. 7, 1992

[54] METHOD OF REFORMING EXISTING GAS PIPE BY REPAIRING JOINT PORTIONS THEREOF

[75] Inventors: Yoji Mori, Nara; Mitsuhide Fujita, Hashimoto; Yasuo Shimazaki, Neyagawa; Koichi Yasui, Nagoya; Yutaka Sugiki, Nakashima; Yasuo Miyazaki, Osaka; Masaaki Ohinata, Nabari, all of Japan

[73] Assignees: Osaka Gas Co., Ltd., Osaka; Toho Gas Co., Ltd., Nagoya; Osaka Bousui Construction Co., Ltd., Osaka, all of Japan

[21] Appl. No.: 635,598
[22] PCT Filed: May 15, 1990
[86] PCT No.: PCT/JP90/00614
    § 371 Date: Jan. 8, 1991
    § 102(e) Date: Jan. 8, 1991
[87] PCT Pub. No.: WO90/14548
    PCT Pub. Date: Nov. 29, 1990

[30] Foreign Application Priority Data

May 16, 1989 [JP] Japan .................................. 1-123789

[51] Int. Cl.⁵ .............................................. B23P 6/00
[52] U.S. Cl. .................................................. 29/402.09
[58] Field of Search ..................... 29/402.09, 402.18; 62/51.1; 137/315, 319

[56] References Cited

U.S. PATENT DOCUMENTS 4,253,497 3/1981 Martin .
4,492,095 1/1985 Brister .
4,505,295 3/1985 Quin et al. .

FOREIGN PATENT DOCUMENTS 1-28279 6/1989 Japan .

Primary Examiner—Timothy V. Eley
Attorney, Agent, or Firm—Armstrong, Nikaido, Marmelstein, Kubovcik & Murray

[57] ABSTRACT

The present invention provides a method of repairing the joint portions of an existing gas pipe by a repairing device which is movable inside the pipe under remote control. The repairing device can be moved into and out of the gas pipe through a work opening formed in an upper portion of the gas pipe by boring means with gas flowing through the pipe and free of the hazard of gas leakage. This reduces the labor required for forming the work opening to start the repair work and for restoring the work opening portion to complete the repair work, consequently assuring a shortened work period and a reduced cost.

6 Claims, 13 Drawing Sheets

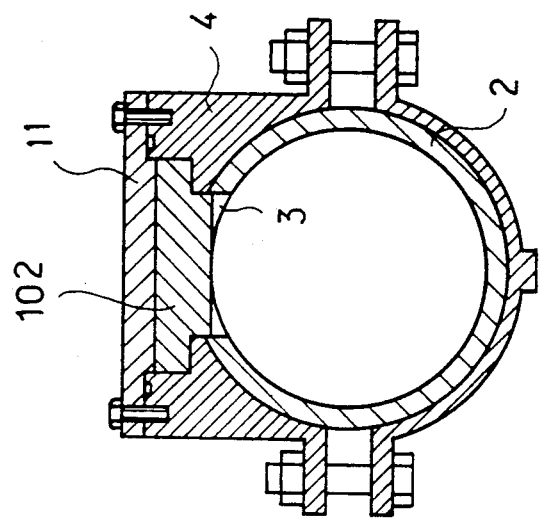
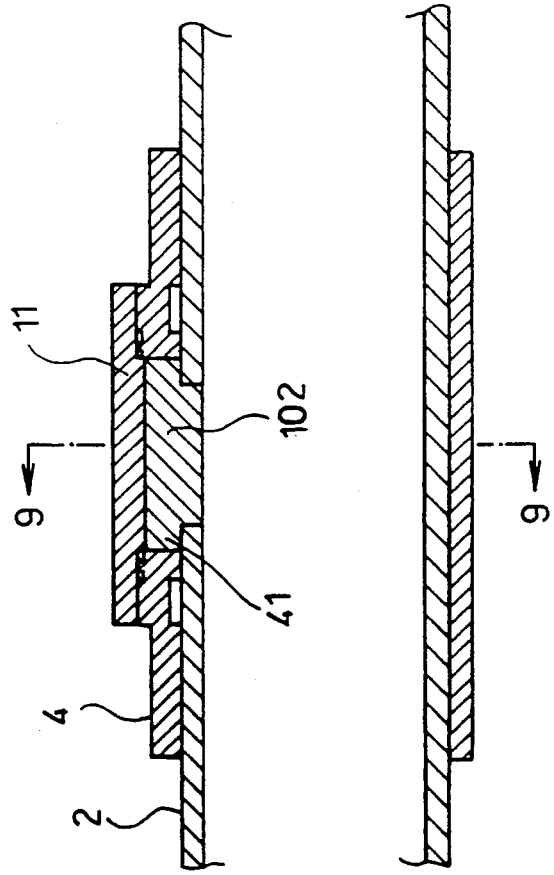

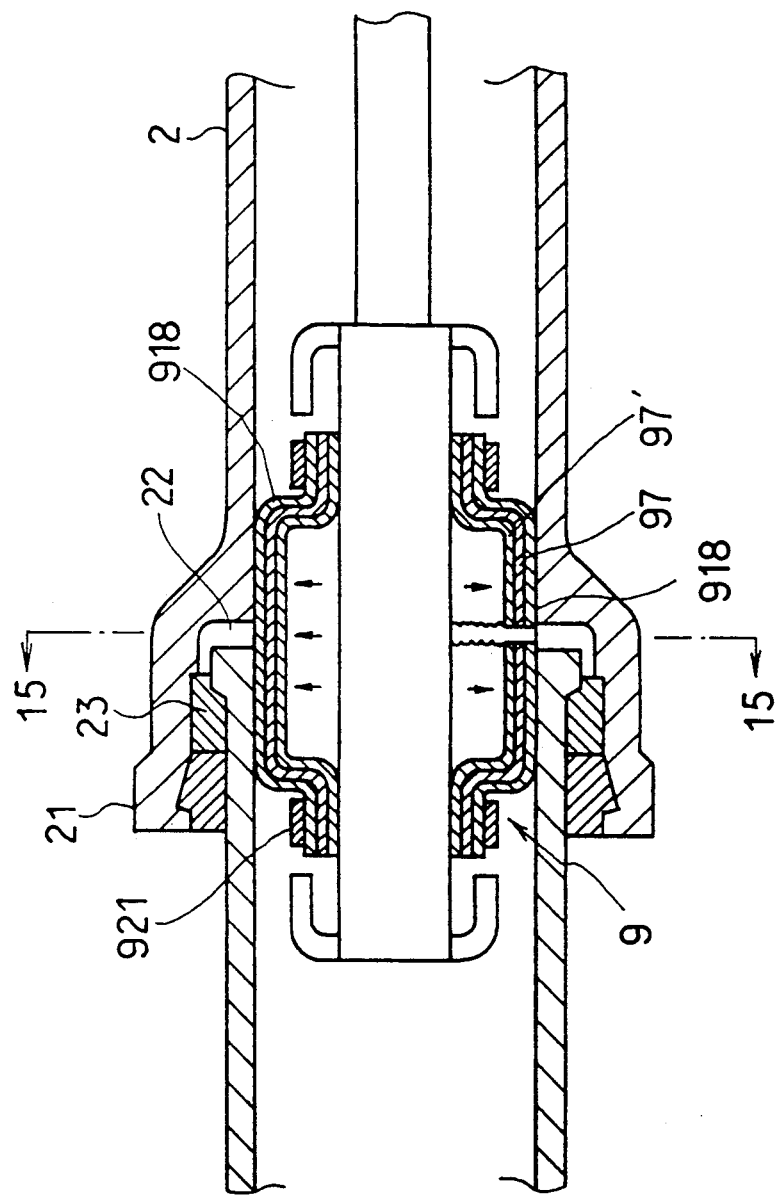

METHOD OF REFORMING EXISTING GAS PIPE BY REPAIRING JOINT PORTIONS THEREOF

TECHNICAL FIELD

The present invention relates to a method of reforming existing gas pipes by repairing the joint portions thereof with a repairing device which is movable inside the pipe under remote control.

BACKGROUND ART

The method of repairing the joint portions of existing gas pipes is already well known which employs a repairing device movable inside the pipe. This method is practiced by moving the repairing device inside the pipe to position the device for the joint portion, and then injecting a liquid epoxy resin agent or like sealing agent into the joint portion as sealed from inside the pipe to seal off a gas leak. The repair work for joint portions of existing gas pipes is performed usually over a length of about 50 m to about 100 m as one span, and the joint portions are arranged usually at a spacing of about 5 m to about 10 m. These joint portions are repaired one after another with the travel of the repairing device inside the pipe regardless of the presence or absence of gas leaks.

In practicing the repairing method, there arises a need to form a work opening in the existing gas pipe to be repaired in order to place the repairing device within the gas pipe and to move the device inside the gas pipe for the repair of the joint portions.

The work opening is conventionally formed by partly cutting away the gas pipe, for example, over a length of about 1 m to about 2 m. A terminal tube for accommodating the repairing device therein is installed in the cutaway portion, as connected to the pipe side to be repaired. The terminal tube is provided with a gate valve at each of its inlet side and outlet side so that the repairing device can be inserted from inside the terminal tube into the pipe having the joint portions to be repaired, with the hazard of gas leakage eliminated by alternately opening and closing the gate valves.

However, the conventional method wherein the work opening is formed by partly cutting away the gas pipe requires the following procedures for forming the work opening and restoring the opening portion to the original state.

(i) The repair work for gas pipe joint portions is performed usually over a section of about 50 m to about 100 m as one span, so that an interruption of gas supply over this section will cause inconvenience to many customers who are supplied with the gas from this section. Accordingly, when the gas pipe is to be partly cut away to form the work opening, it becomes necessary to install bypass pipe to ensure the flow of the gas.

(ii) To prevent gas leakage when the pipe is cut away, there arises a need to shut off the gas by inflating a bag within the gas pipe at each side of the cutaway portion as required for various kinds of gas piping work.

(iii) After the terminal tube and the gate valves have been provided in the cutaway portion of the gas pipe at the pipe side to be repaired, the means for shutting off the gas must be removed from the pipe to be repaired in order to insert the repairing device from inside the terminal tube into the pipe.

(iv) After the joint portions have been repaired by the repairing device, the repaired pipe must be blocked with the bag again to shut off the gas for the removal of the terminal tube and the gate valves.

(v) Restoration of the cutaway portion of the gas pipe.

(vi) Removal of the gas shutting off means and the bypass pipe.

As will be apparent from the procedures (i) to (vi), the conventional method requires much labor and time for the formation of the work opening and restoration of the pipe, which result in a longer period and an increased cost for the repair.

DISCLOSURE OF THE INVENTION

The main object of the present invention is to provide a repair method of the type described above in which a work opening can be easily formed and is easily closable for restoration to ensure a shortened work period and a reduced cost.

Other features of the present invention will become apparent from the following description.

The present invention provides a method of repairing the joint portions of an existing gas pipe by a repairing device which is movable inside the pipe under remote control with gas flowing through the pipe, the method being characterized in that the method includes the steps of forming a work opening in an upper portion of the gas pipe by boring with the gas flowing through the pipe and closing the work opening with a gate valve provided at the work opening externally of the pipe, connecting a support tube to the pipe at the work opening closed with the gate valve for the tube to extend upwardly of the pipe with the gate valve interposed therebetween, inserting a guide tube into the support tube in sliding contact therewith through an open upper end thereof, closing the upper open end of the support tube and thereafter opening the gate valve to open the work opening, the repairing device being accommodated within the guide tube so as to be operable by remote control, the guide tube being closed at its upper end and having at its lower portion an outlet for the repairing device to move out of or into the guide tube therethrough as deflected toward a horizontal or vertical direction, and inserting the guide tube from inside the support tube into the gas pipe through the opened work opening to position the outlet of the guide tube within the gas pipe, the repairing device being movable from inside the guide tube into the gas pipe through the work opening and the guide tube outlet as positioned within the gas pipe to repair the joint portions, the repairing device being returnable into the guide tube through the opening and the outlet after repairing the joint portions.

According to the method of the present invention, a boring device is used in combination with a gate valve to form a work opening in an upper portion of a gas pipe with the gas flowing through the pipe and to provide the gate valve at the work opening externally of the pipe.

The boring device has a boring head for boring the gas pipe and a cover for preventing the discharge of the gas through the bored portion, and is mounted on a base frame removably attached to the gas pipe, with the gate valve interposed between the device and the base frame. After a bore serving as the work opening is formed in the upper portion of the gas pipe with the boring head, the bore is closed with the gate valve, and the boring device is subsequently removed from the base frame. Such a boring device itself is already known for use in various kinds of gas piping work.

The work opening formed in the gas pipe upper portion by the boring device is accurately circular when seen in plan view and has a diameter which can not be larger than the bore diameter of the gas pipe. Although the diameter of the work opening is preferably as large as possible from the viewpoint of repair work, it is suitably determined usually within the range of about 3/10 to about 8/10 of the bore diameter of the gas pipe in view of the boring operation.

A support tube is attached to the gas pipe at the work opening externally of the gate valve so as to extend upward. The support tube, cooperating with the guide tube to be described below, serves to provide a space for the installation of a repairing device externally of the gate valve, and has a diameter approximately equal to the diameter of the work opening and a length about 2 to about 8 times the bore diameter of the gas pipe. The support tube may be upright or slightly inclined, for example, at an angle of about 5 to about 15 degrees rearward with respect to the direction of insertion of the repairing device into the gas pipe.

The guide tube has an outside diameter slightly smaller than the inside diameter of the support tube and is closed at its upper end with a closure member, preferably with rubber of like highly elastic closure member. The upper end of the guide tube may be closed after the tube has been inserted into the support tube. The repairing device is accommodated within the guide tube so as to be operable by remote control. The remote control means itself is substantially the same as those for use in the conventional method. The guide tube is formed at its lower portion with an outlet for the repairing device to move into or out of the ga pipe therethrough. The outlet serves to guide the repairing device as oriented vertically toward a horizontal direction when the device advances into the gas pipe and to guide the device from the horizontal orientation to the vertical orientation when it is retracted from inside the gas pipe. The vertical length of the outlet must be smaller than the length of the support tube and is usually approximately equal to the bore diameter of the gas pipe to twice the diameter.

The repairing device is tubular like those for use in the conventional method and has an axial channel extending therethrough, permitting the gas to flow through the channel to maintain the flow of gas through the gas pipe when expanded within the pipe.

The repairing device is not specifically limited in outside diameter or length insofar as it is movable from inside the guide tube into the gas pipe. For example, the outside diameter is approximately equal to the inside diameter of the guide tube, and the length is about one to two times the bore diameter of the gas pipe. If the length is larger than the bore diameter of the gas pipe, it is desirable to make the device flexible.

The repairing device can be of various constructions already known for use in the conventional methods. The device can be one of those improved by the present applicant. One improved type is so adapted that the gas in joint portions can be discharged to the outside through a sealing portion of the device when a liquid agent is injected and filled into the joint portion. With another improved type, the liquid agent can be injected and filled as foamed into the joint portion uniformly over the entire range of 360 degrees.

The guide tube having the repairing device accommodated therein is inserted into the support tube in sliding contact therewith through an open upper end thereof to a position close to and above the gate valve at its lower end, whereby the open upper end of the support tube is closed with the guide tube to render the gate valve openable free of the hazard of gas leakage. After the gate valve is opened in this state to open the work opening, the guide tube can be brought into the gas pipe from inside the support tube through the work opening.

After the outlet of the guide tube at its lower portion has been positioned within the gas pipe, the repairing device is inserted from inside the guide tube into the gas pipe through the outlet and is further moved inside the gas pipe to repair joint portions in the same manner as in the case of the conventional method.

After repairing the joint portions, the repairing device is retracted from inside the gas pipe into the guide tube through the outlet. Next, the gate valve is closed, the guide tube and the support tube are removed from the gas pipe, and the work opening portion of the pipe is restored to the original state by means which is usually employed for various kinds of gas piping work, whereby the repair work is entirely completed.

According to the repair method of the present invention, gas pipe joint portions can be repaired by the repairing device utilizing a work opening formed in an upper portion of the gas pipe with use of boring means. This eliminates the need to install and remove a bypass pipe or gas shutting-off means for forming the work opening and restoring the opening portion of the pipe, consequently greatly facilitating the formation of the work opening and the restoration of the pipe and leading to a shortened work period and a reduced cost.

BRIEF DESCRIPTION OF THE DRAWINGS

FIGS. 6 to 8 are diagrams showing stepwise an example of work for restoring the work opening portion;

FIG. 9 is a view in section taken along the line 9—9 in FIG. 8;

FIG. 14 is a view in longitudinal section showing the repairing device of FIG. 12 in use for repairing.

BEST MODE OF CARRYING OUT THE INVENTION

A mode of practicing the method of the present invention will be described below with reference to the accompanying drawings.

Figure 1:
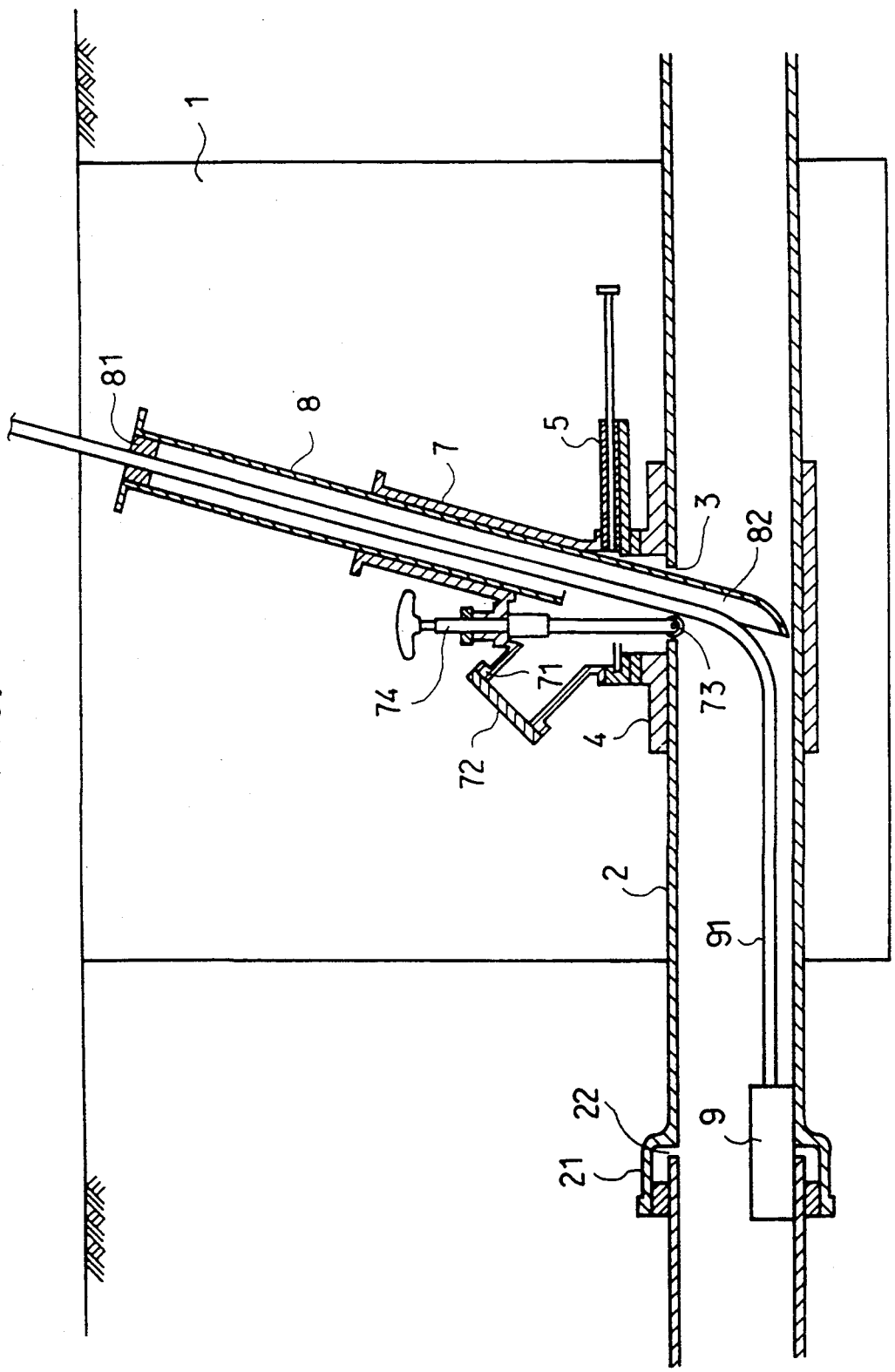
FIG. 1 is an overall view schematically showing a mode of practicing the method of the invention.

Before practicing the present method, a work pit 1 is first excavated in the ground as shown in FIG. 1. Next, a work opening 3 is formed in an upper portion of an existing gas pipe 2 within the work pit 1 by boring means.

Figure 2:
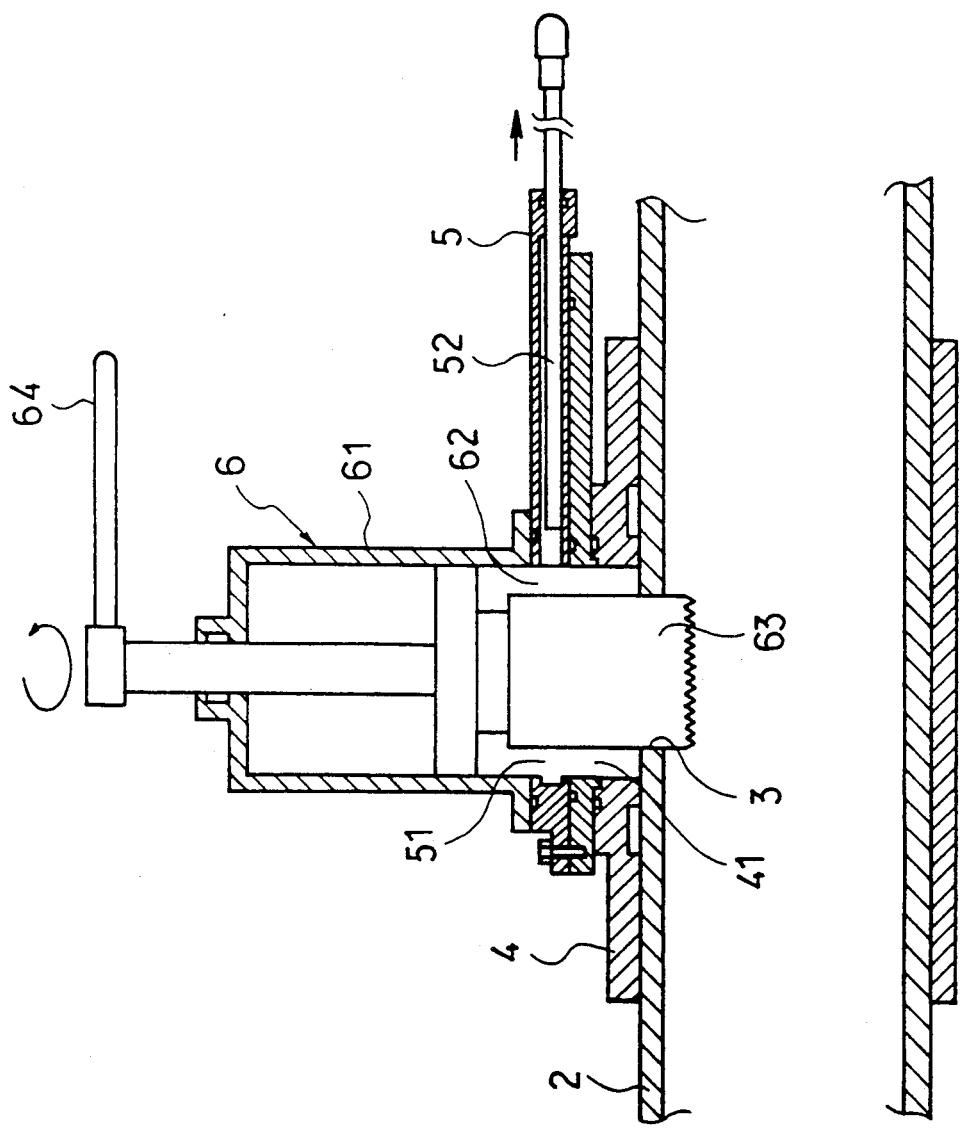
FIG. 2 is a fragmentary enlarged view in section showing a work opening as formed in an upper portion of an existing gas pipe by boring means.
Figure 3:
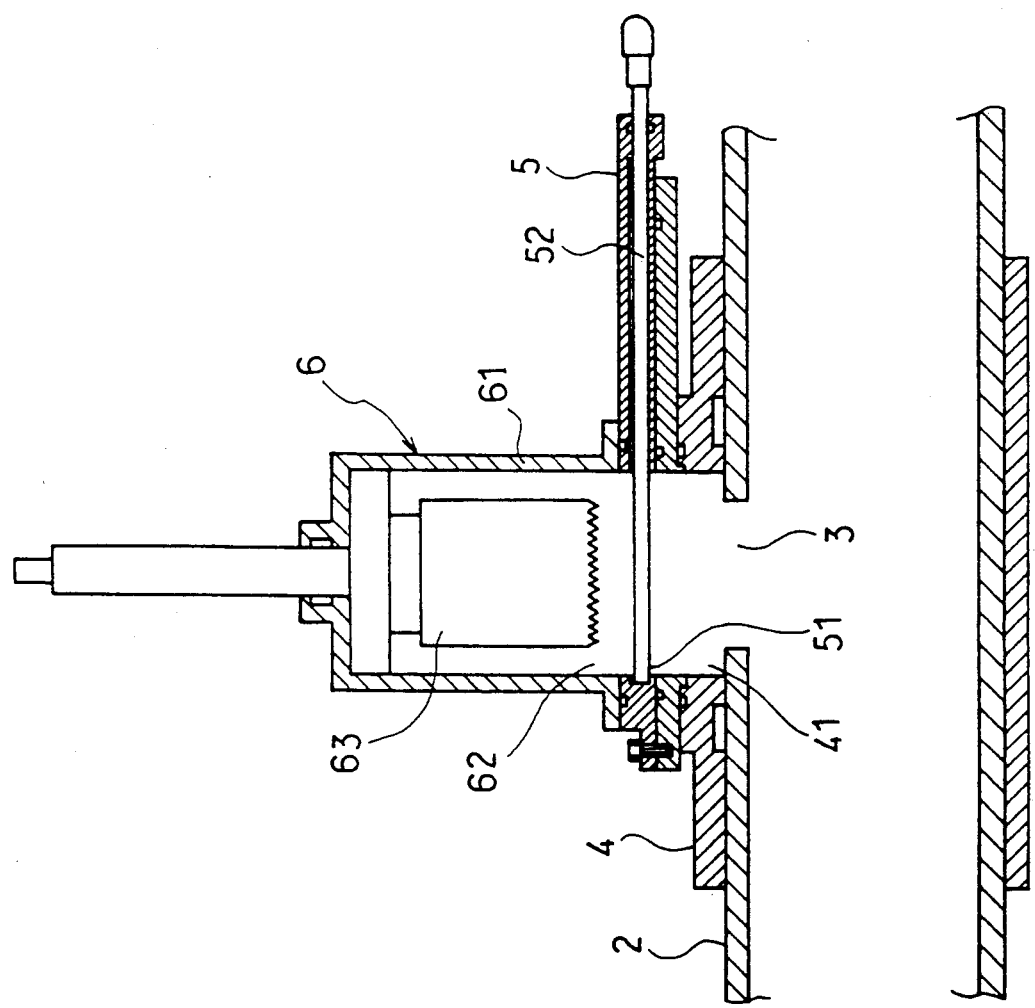
FIG. 3 is a fragmentary enlarged view in section showing the work opening as closed with a gate valve.

FIGS. 2 and 3 show in detail the step of forming the work opening 3. A base frame 4, a gate valve 5 and a boring device 6 are fixedly mounted on the gas pipe 2.

The base frame 4, which is in the form of a split hollow cylinder, is fixedly fitted around the gas pipe 2. The base frame 4 has an aperture 41 formed in the center of its upper portion and circular in a plan view. The upper portion of the gas pipe 2 where the work opening is formed is positioned inside the aperture 41.

The gate valve 5 is fixedly mounted on the base frame 4 and has a valve opening 51 which is identical with the aperture 41 of the base frame 4 in shape and vertically in register therewith. The gate valve 5 has a shutter plate 52 which is held in an opened position as seen in FIG. 2 to leave the valve opening 51 open until the boring operation is completed.

The boring device 6 has a caplike body 61 fixedly mounted on the gate valve 5. The body 61 has at its lower end an opening 62 having the same diameter as the valve opening 51 and vertically in register therewith. Disposed inside the body 61 is a boring head 63 which is rotatable by a handle 64 to move upward or downward.

After the work opening 3 has been formed in the upper portion of the gas pipe 2 by operating the boring device 6 as shown in FIG. 2, the boring head 63 is retracted to a position above the gate valve 5, and the gate valve 5 is then closed as shown in FIG. 3. In this state, the boring device 6 is removed. Thus, the work opening 3 as closed with the gate valve 5 can be formed in the upper portion of the gas pipe 2.

During the boring operation for forming the work opening 3, the caplike body 61 of the boring device 6 prevents gas leakage, while after the completion of the boring operation, the closed gate valve 5 prevents gas leakage, so that the work opening 3 can be formed with the gas flowing through the pipe 2.

The base frame 4, the gate valve 5 and the boring device 6 are not novel but are already in use for boring gas pipes in various kinds of gas piping work.

According to the method of the present invention, such known boring means is used for forming the work opening 3 in the upper portion of the gas pipe 2, and the gate valve 5 is further provided at the work opening 3 externally of the pipe.

The work opening 3 is used as an inlet and outlet for the repairing device to be described below. The diameter of the opening is preferably as large as possible insofar as the opening can be formed. With the present embodiment, the diameter is approximately 3/5 of the bore diameter of the gas pipe 2. If largest, the diameter of the work opening 3 can be as large as about ⅔ of the bore diameter of the gas pipe 2.

Figure 4:
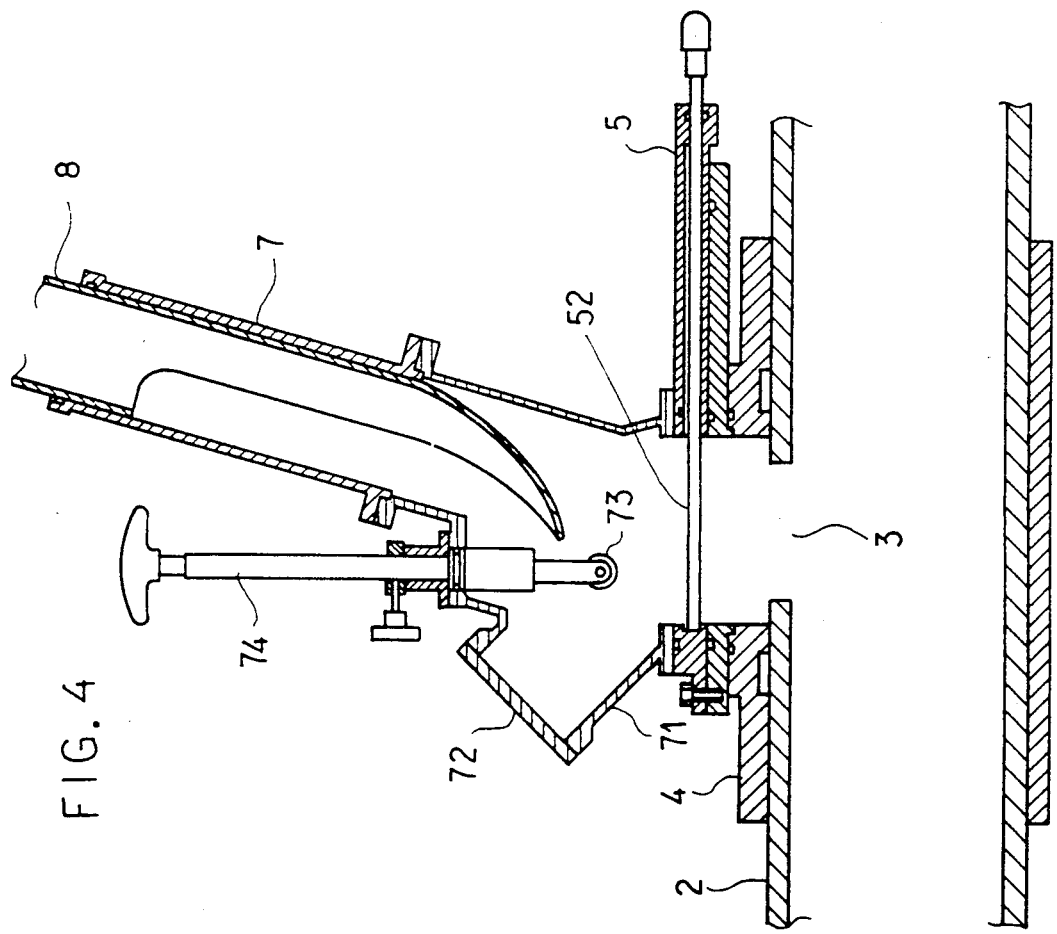
FIG. 4 is a fragmentary enlarged view in section showing a support tube as attached to the pipe at the work opening.

In place of the boring device 6 removed from the gate valve 5, a support tube 7 is attached thereto as seen in FIG. 4. The support tube 7 has the same diameter as the valve opening 51 and a length about 2.5 times the bore diameter of the gas pipe 2, and is inclined rearward from an upright position by about 10 degrees.

With the support tube 7 mounted in place, a guide tube 8 is inserted into the support tube 7 in sliding contact therewith.

Figure 5:
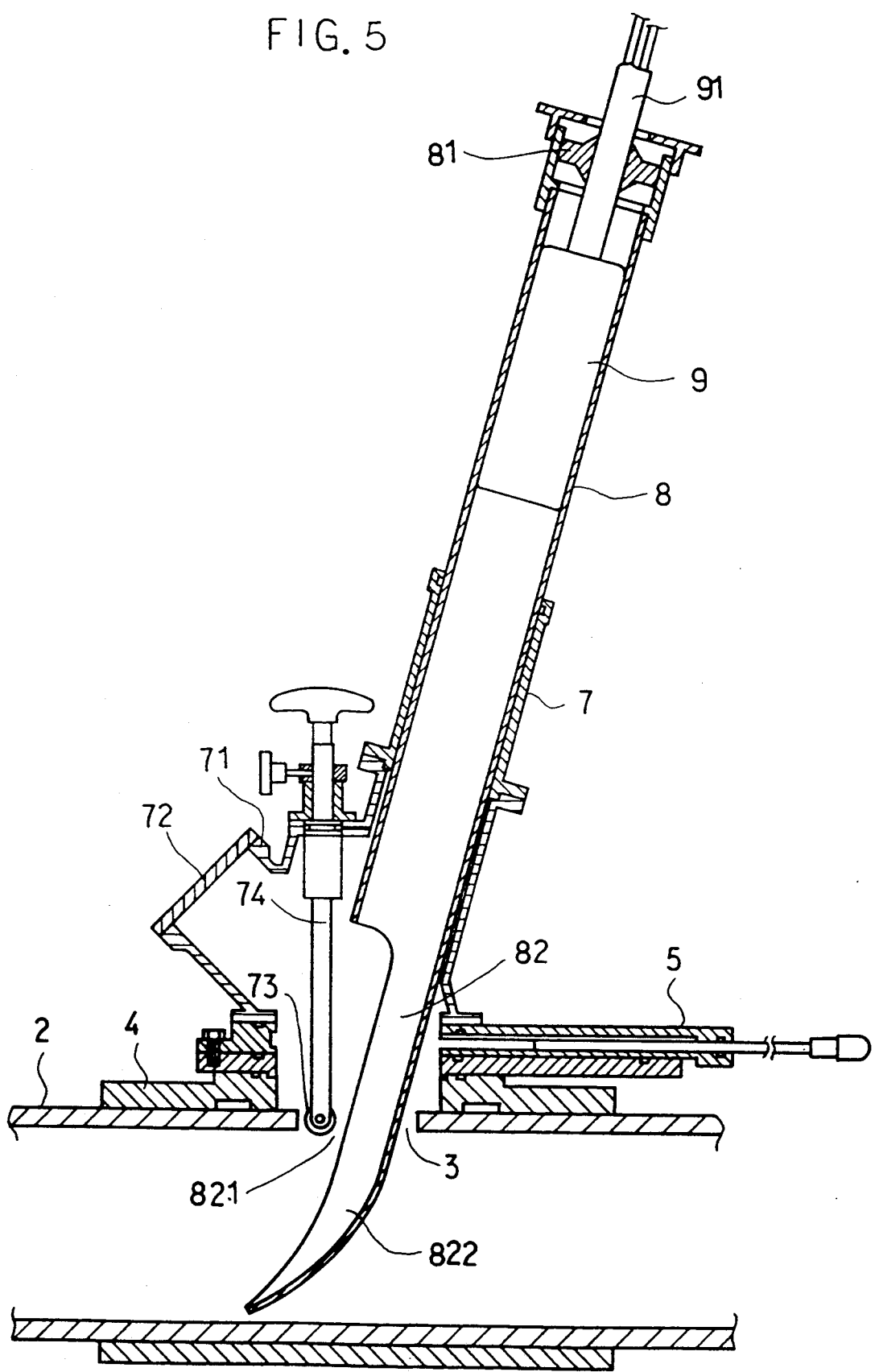
FIG. 5 is a fragmentary enlarged view in section showing an outlet at the lower portion of a guide tube as positioned inside the gas pipe.

The guide tube 8, as shown in its entirety in FIG. 5, has an upper end closed with an elastic closure member 81 as of rubber and has the repairing device 9 accommodated therein slidably. The repairing device 9 has attached to its rear end a flexible rod 91 for operating the device from outside the tube. The rod 91 extends outward from the tube through the closure member 81 at the upper end of the guide tube 8.

The guide tube 8 has an outlet 82 for the repairing device 9 at its lower portion. The outlet 82 has a front open portion 821 formed by cutting away a half tube portion, and the remaining half tube portion, i.e., a rear closed portion 822. The lower part of the semitubular closed portion 822 is slightly curved toward the direction of insertion of the repairing device 9 so as to facilitate a change in the orientation of the device when it is moved out of or into the guide tube.

The guide tube 8 is inserted into the support tube 7 in two divided steps. In the first step, the tube 8 is brought to a shallow position close to the closed gate valve 5 thereabove as shown in FIG. 4. This makes it possible to open the gate valve 5 with the open upper end of the support tube 7 closed and therefore with gas leakage prevented. In the second step, the guide tube 8 is brought deep into the gas pipe 2 through the gate valve 5 in an opened state and through the work opening 3 as seen in FIG. 5, whereby the outlet 82 of the guide tube 8 at its lower portion can be positioned inside the gas pipe 2. The insertion of the guide tube 8 into the support tube 7 in the shallow and deep two steps makes the repairing device 9 ready for insertion into the gas pipe 2 through the work opening 3.

When the flexible rod 91 is manipulated to push the repairing device 9 downward in the state shown in FIG. 5, the repairing device 9 is brought to the outlet 82 at the lower portion of the guide tube 8 while moving down the tube, and is then inserted into the gas pipe 2 through the front open portion 821 of the outlet 82 while changing its orientation from vertical to horizontal by being guided by the curved part of the rear semicircular closed portion 822 of the outlet 82 and by the inclination (about 10 degrees) of the guide tube 8.

The repairing device 9 inserted in the gas pipe 2 is moved inside the pipe and positioned at the joint portion 21 (see FIG. 1), where the device 9 operates in the usual manner to repair the joint portion 21 from inside the pipe.

Joint portions 21 are repaired one after another as the repairing device 9 is moved along inside the pipe over a distance of 50 m to 100 m, with the gas flowing through the pipe 2 owing to the tubular configuration (see FIG. 10) of the repairing device 9.

After all the joint portions 21 have been repaired, the support tube 7, the guide tube 8 and the repairing device 9 are removed from the gas pipe 2 for collection. These means can be collected easily with the gas flowing through the gas pipe 2 and free of the hazard of gas leakage by the successive steps of returning the repairing device 9 from inside the gas pipe 2 to the inside upper portion of the guide tube 8 shown in FIG. 5 through the outlet 82 of the guide tube 8 at its lower portion, withdrawing the guide tube 8 to the shallow inserted position shown in FIG. 4, and closing the work opening 3 with the gate valve 5.

Figure 6:
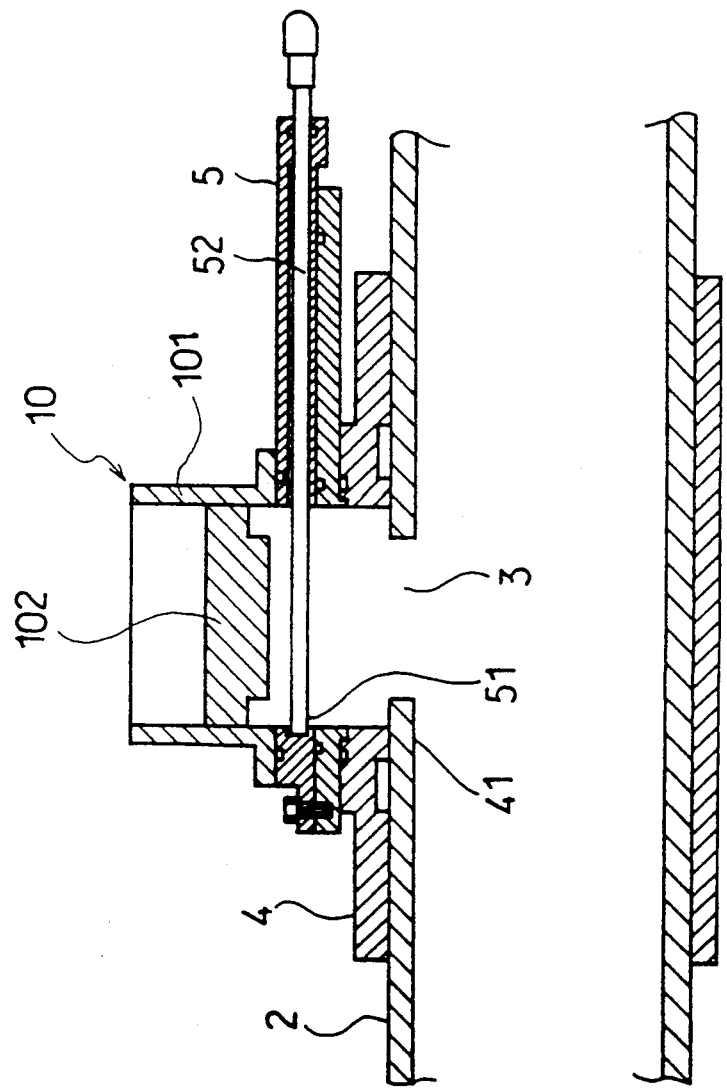

The collection of the above means is followed by work for restoring the work opening portion 3. An example of restoration work will be described with reference to FIGS. 6 to 9. First, a cylindrical closure member 10 is mounted on the gate valve 5 with the valve 5 closed as seen in FIG. 6. The closure member 10 comprises a cylinder 101 having the same diameter as the valve opening 51 of the gate valve 5 and connectable to the valve, and a slidable rubber closure 102 provided inside the cylinder 101.

The gate valve 5 is opened in the state shown in FIG. 6, and the closure 102 is subsequently forced into the aperture 41 of the base frame 4 through the valve opening 51.

Figure 7:
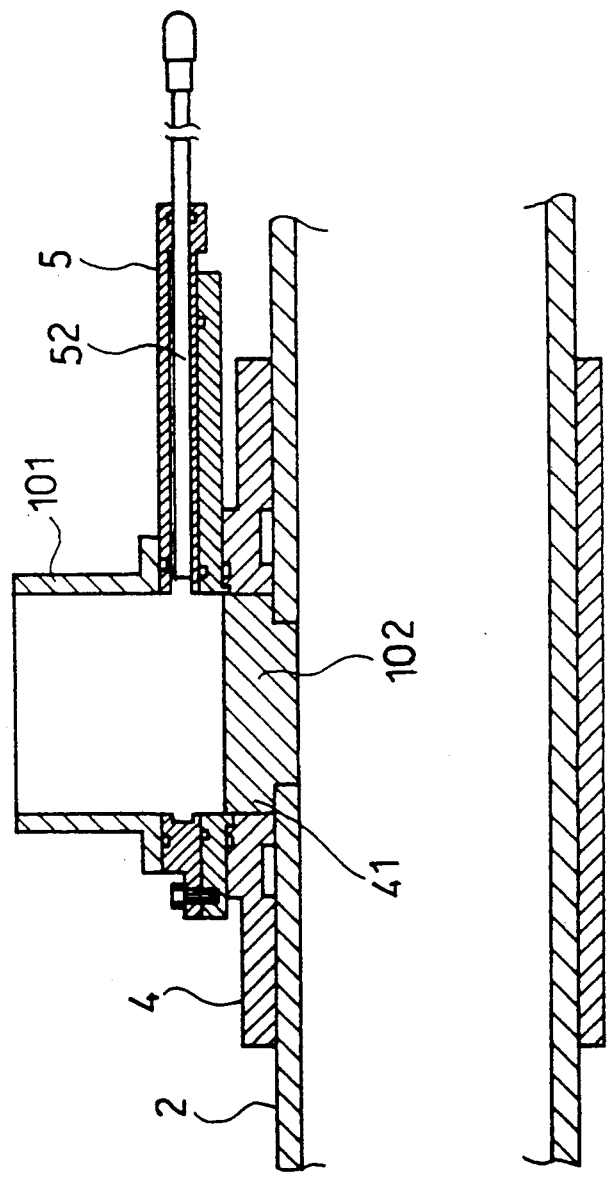

The closure 102 forced into the aperture 41 closes the work opening 3 as shown in FIG. 7, so that the gate valve 5 and the cylinder 101 are removed in this state. Next, the aperture 41 of the base frame 4 is closed with a cover plate 11, whereby the work opening portion 3 can be restored as seen in FIGS. 8 and 9. Thus, the repair work is completed.

The method of the present invention utilizes a work opening formed in an upper portion of the gas pipe by boring means for the repairing device to repair the joint portions of the pipe. The work opening can therefore be formed and closed for restoration more easily than in the case of the conventional method wherein the work opening is formed by cutting the pipe away over a length of about 1 m to about 2 m. This assures a shortened work period and a reduced cost.

According to the present invention, the support tube 7 may be provided at its lower portion with a branch 71 having an inspection window 72 as shown in FIG. 5 for the operator to monitor the portion of work opening 3 therethrough. The window 72 may be opened for the inspection of the interior.

Further when the repairing device 9 is to be inserted into the gas pipe 2, the front edge of the repairing device 9 tends to come into contact with the front edge defining the work opening 3, making it likely that the edge-to-edge contact will cause damage to the repairing device 9, especially to the surface member thereof. The likelihood of damage can be obviated by disposing a guide roll 73 within the work opening 3 in the vicinity of the front edge thereof as seen in FIG. 5. The guide roll 73 is mounted on the lower end of a support rod 74 movable upward and downward for adjustment and inserted through the junction of the support tube 7 and the branch 71 inwardly thereof. As shown in FIG. 4, the rod 74 is usually held in a raised position to hold the guide roll 73 retracted to above the work opening 3. When the repairing device 9 is to be inserted into the gas pipe 2, on the other hand, the rod 74 is moved down to a lowered position as seen in FIG. 5 to position the guide roll 73 within the work opening 3 close to its front edge. When the repairing device 9 is moved along inside the pipe, the guide roll 73 is in engagement with the flexible rod 91 for the remote control of the repairing device 9 to guide the rod 91.

Figure 10:
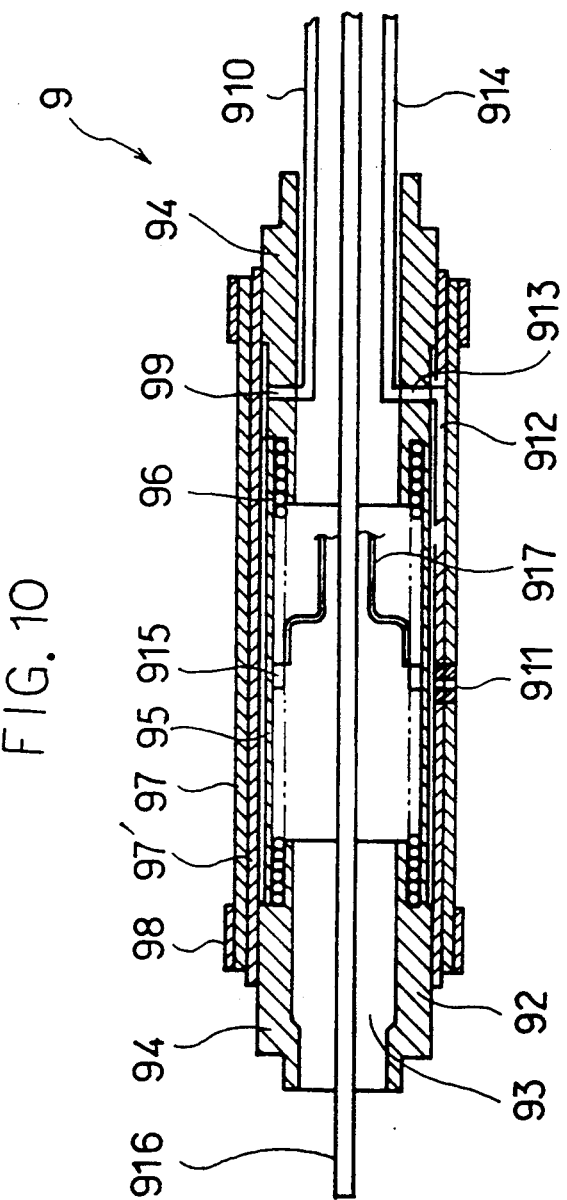
FIG. 10 is a view in longitudinal section showing an example of repairing device for use in the method of the invention.
Figure 11:
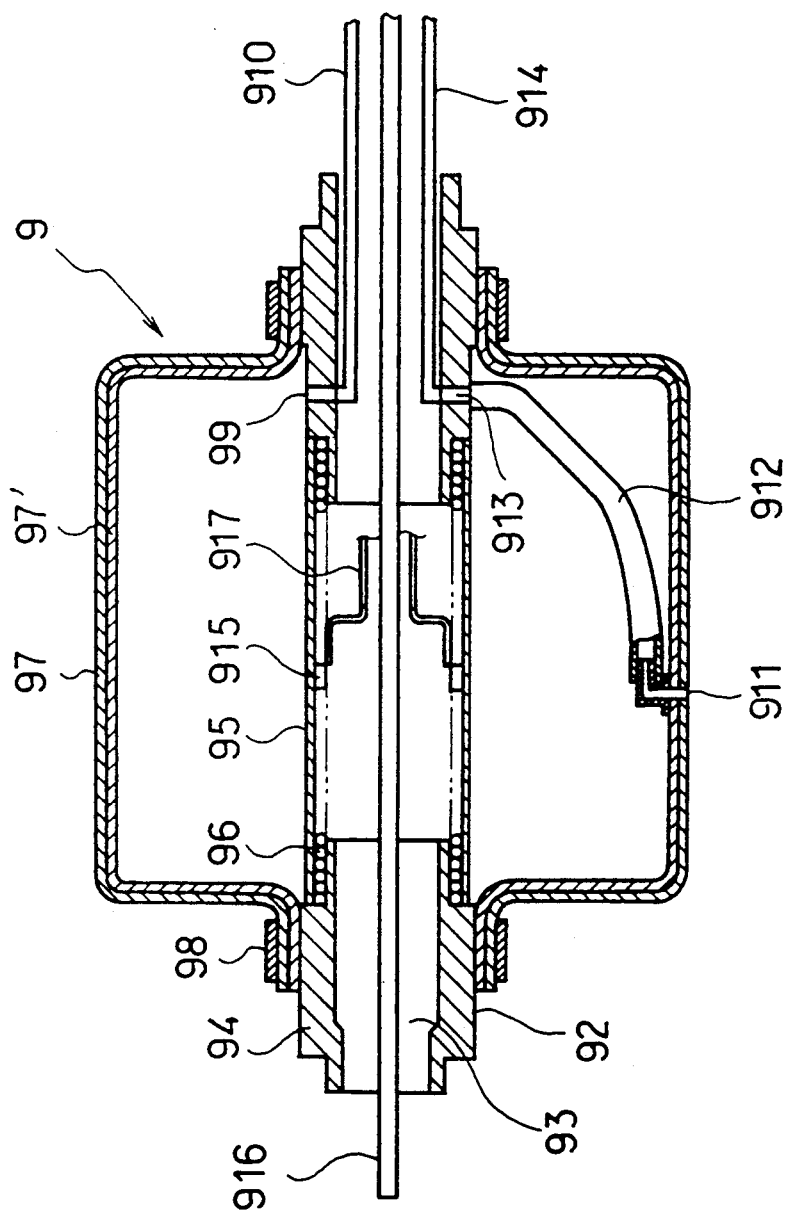
FIG. 11 is a view in longitudinal section showing the repairing device in use for repairing.
Figure 12:
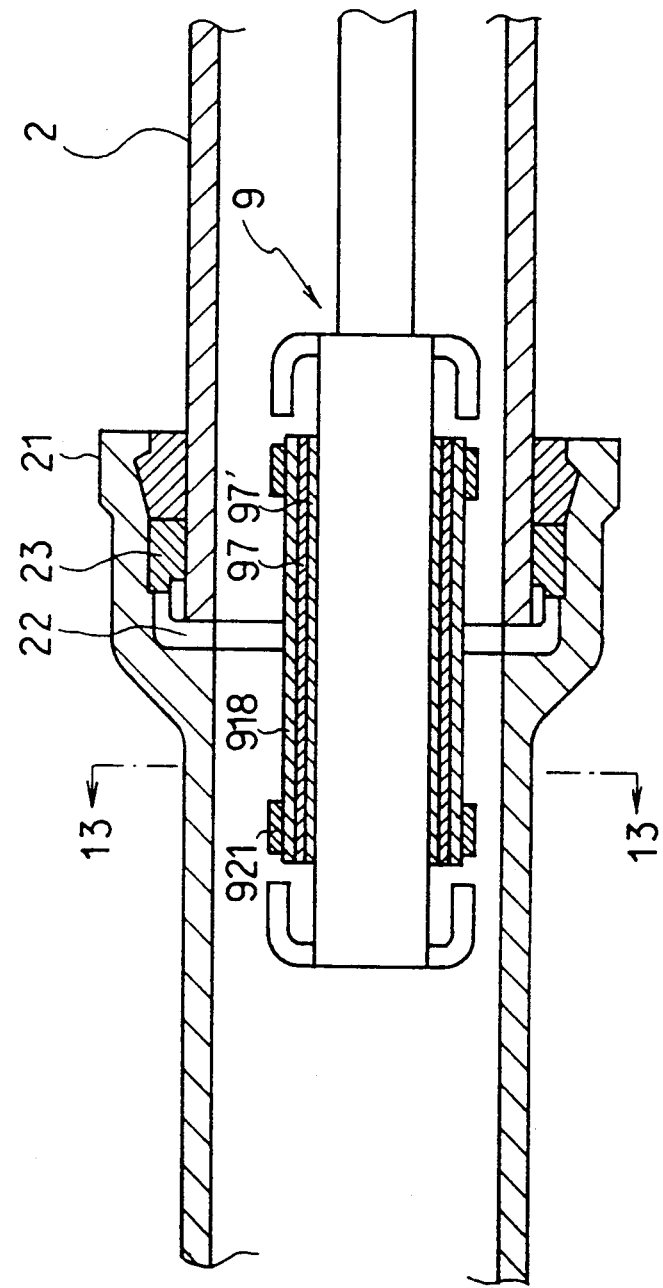
FIG. 12 is a view in longitudinal section showing another example of repairing device.

FIGS. 10 and 11 show another preferred example of pipe repairing device 9 for use in the method of the present invention. The pipe repairing device 9 has a tubular body 92, the hollow portion of which serves as a flow channel 93.

The body 92 comprises end members 94, 94 at its respective ends and a coiled spring 96 having a cover 95 for interconnecting these end members 94, 94. The portion of coiled spring 96 renders the body freely flexible. Such a flexible structure is useful for permitting the device to smoothly move from the guide tube 8 into the gas pipe 2 and vice versa. The cover 95 closes the outer periphery of the flow channel 93 and is made of an elastic material such as rubber or soft plastics.

Outer and inner rubber tubes 97, 97' are provided around the outer periphery of the body 92 as a double layer and are fastened to the end member 94 with a band 98 at each end. Of these rubber tubes, the outer 97 is used for sealing, and the inner 97' for expansion. The outer tube is made, for example, of sponge rubber. The interior of the inner rubber tube 97' is in communication with a pressure gas supply (not shown) on the ground via a supply-discharged port 99 formed in the body 92 and a gas (e.g., town gas) duct 910 communicating with the port.

The rubber tubes 97, 97' have a liquid agent injection port 911. The port 911 is in communication with a liquid agent pressure feeder (not shown) on the ground via a first liquid conduit 912, a supply port 913 formed in the body 92 and a second liquid conduit 914 communicating with the supply port 913.

The body 92 is provided with a known joint sensor 915 positioned in corresponding relation with the injection port 911 for detecting the joint portion 21 (see FIG. 1). The sensor 915 can be a sensor of the type which is operable upon detecting a magnetic variation occurring at a clearance of the pipe joint portion 21.

The repairing device 9 is moved through the guide tube 8 and the gas pipe 2 with its rubber tubes 97, 97' contracted as shown in FIG. 10, is positioned at the pipe joint portion 21 (see FIG. 1) upon the joint sensor 915 detecting the joint portion, and has its rubber tubes 97, 97' inflated into intimate contact with the inner periphery of the joint portion 21 as shown in FIG. 11. A liquid repair agent can subsequently be injected and filled into the joint portion 21 through the clearance 22 thereof (see FIG. 1) from the injection port 911 of the device 9 to thereby repair the joint portion 21. When one joint portion 21 is completely repaired, the rubber tubes 97, 97' are contracted to the state shown in FIG. 10, whereupon the device is moved along again inside the gas pipe 2 for the repair of the next joint portion.

If the internal gas pressure of the gas pipe 2 drops during the repair work on the joint portion 21 by the repairing device 9, gas flames at the customer could go out, hence a hazard. According to the invention, it is therefore desirable that the repairing device 9 be provided with a gas pressure measuring tube 916 as shown in FIGS. 10 and 11 for monitoring the internal gas pressure of the tube 916 on the ground so as to eliminate such a hazard.

The tube 916 and other members, i.e., the gas duct 910, the second liquid conduit 914, and lead wires 917 or the like attached to the joint sensor 915, extend through a hollow portion of the flexible rod 91 (see FIG. 5) and are guided to the ground level for connection to respective devices or the like.

FIGS. 12 to 15 schematically show another example of repairing device 9 for use in the method of the present invention.

The repairing device 9 has substantially the same construction as the one shown in FIGS. 10 and 11 except that the outer 97 of the tubular seal members 97, 97' is provided on its outer periphery with a plurality of, e.g., four, ridges 918 extending axially of the device.

Figure 15:
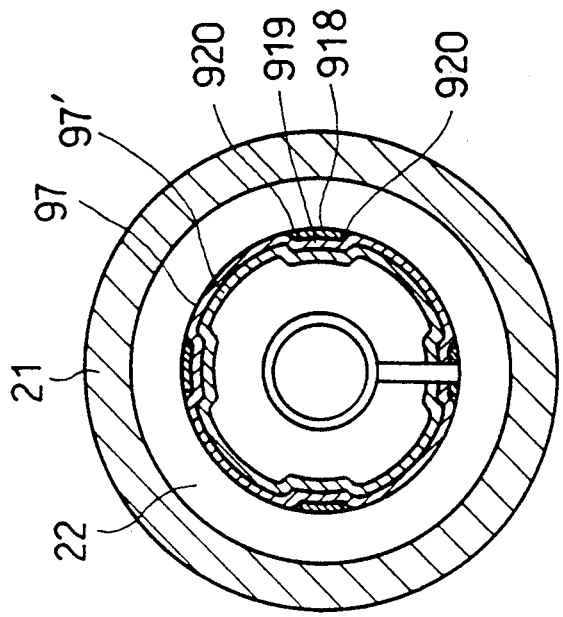
FIG. 15 is a view in section taken along the line 15—15 in FIG. 14.
Figure 13:
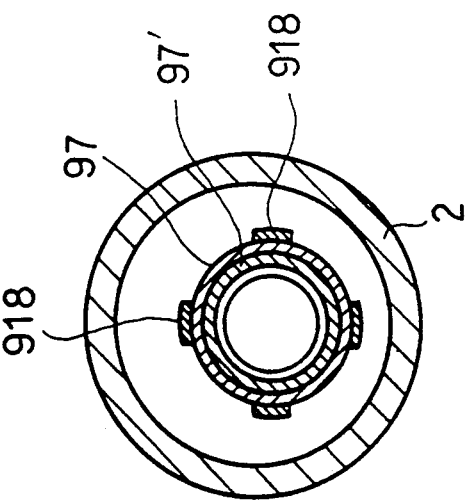
FIG. 13 is a view in section taken along the line 13—13 in FIG. 12.

The ridges 918 are usually held projected as shown in FIG. 13, but when the tubular seal members 97, 97' are inflated into pressing contact with the inner peripheral surface of the gas pipe 2, the ridges 918 are depressed into the outer surface of the tubular seal member 97 by the pipe inner peripheral surface, with the result that gas discharge passages 920, 920 are formed along the opposite sides of the depressed portions 919 as shown in FIG. 15.

During the injection of the sealing agent as shown in FIG. 14, the gas inside the pipe joint portion 21, and therefore within a fibrous material filled portion 23, is discharged therefrom to the outside through the gas discharge passages 920 as an increasing amount of the sealing agent is injected into the joint portion. Through this gas-liquid replacement, the sealing agent can be fully effectively injected and filled into the fibrous material filled portion 23 in its entirety within the pipe joint portion 21.

The sealing agent injected into the joint portion 21, i.e., into the fibrous material filled portion 23, gradually rises from the lower end. It is therefore required that the gas discharge passages 920, 920 provided by at least one ridge 918 be positioned at the upper portion of the tubular seal members 97, 97'. According to the present invention, the plurality of ridges 918 are provided as equidistantly spaced apart circumferentially of the pipe, so that at least one ridge 918 will be positioned at the upper portion of the tubular seal members 97, 97'. This assures the discharge of gas until, or almost until the completion of the sealing agent injection operation.

The number of ridges 918 is not limited specifically insofar as it is at least two, whereas if the repairing device 9 has two ridges, it is likely that the device will fail to exhibit the gas discharge function relatively early depending on the orientation of the device. However, provision of an excessive number of ridges will produce an adverse effect on the sealing function. Accordingly, it is suitable to provide three to five ridges; the illustrated device has four ridges.

The ridges 918, which may be integral with the tubular seal member 97, are usually formed separately therefrom and fastened at their opposite ends to the tubular seal members 97, 97' with fasteners 921.

When formed separately, the ridges 918 are satisfactorily serviceable when made of a material which is stretchable with the expansion of the tubular seal member 97. Usually used for making the ridges are strings of rubber (inclusive of sponge) which are rectangular in cross section as illustrated or which have a circular or other cross section.

We claim:

1. A method of repairing joint portions of an existing gas pipe, comprising:
    attaching a base frame to the pipe, the base frame having a gate valve and a boring device attached thereto externally of the gas pipe;
    forming a work opening in an upper portion of the gas pipe with the boring device, said gate valve being open during the boring of the work opening whereby the flow of gas through the gas pipe is maintained;
    connecting a support tube in place of the boring device while said gate valve is closed, the support tube extending upwardly of the gas pipe with the gate valve interposed therebetween;
    inserting a guide tube into the support tube in sliding contact therewith through an open upper end thereof to a position close to the gate valve, a repair device operable by remote control being accommodated within the guide tube;
    closing the upper end of the support tube and thereafter opening the gate valve;
    inserting the guide tube from inside the support tube into the gas pipe through the work opening to position an outlet of the guide tube within the gas pipe;
    moving the repair device into the gas pipe through the outlet of the guide tube;
    repairing the joint portions by the repair device; and returning the repair device to the guide tube.

2. A repairing method as defined in claim 1, wherein the work opening formed in the upper portion of the gas pipe has a diameter corresponding to ⅓ to ⅔ of the bore diameter of the gas pipe.

3. A repairing method as defined in claim 1, wherein the support tube and the guide tube are inclined rearward from an upright position by 5 to 15 degrees.

4. A repairing method as defined in claim 1, wherein a guide roll in rotatable contact with the front portion of the repair device is disposed within the work opening at its front portion to prevent the front portion of the repair device from coming into contact with the front edge defining the work opening when the repair device is moved into or out of the gas pipe through the work opening.

5. A repairing method as defined in claim 1, further comprising the steps of removing the guide tube from the gas pipe and closing the gate valve.

6. A repairing method as defined in claim 5, further comprising the steps of replacing the support tube with a closure member, opening the gate valve, and closing the work opening with a closure.

* * * * *